(12) United States Patent
Jaraudias

(10) Patent No.: US 9,323,953 B2
(45) Date of Patent: Apr. 26, 2016

(54) SYSTEM FOR MANAGING SECURE AND NONSECURE APPLICATIONS ON ONE AND THE SAME MICROCONTROLLER

(71) Applicant: SCHNEIDER ELECTRIC INDUSTRIES SAS, Rueil-Malmaison (FR)

(72) Inventor: Patrice Jaraudias, Biot (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 0 days.

(21) Appl. No.: 14/387,016

(22) PCT Filed: Apr. 4, 2013

(86) PCT No.: PCT/EP2013/057116
§ 371 (c)(1),
(2) Date: Sep. 22, 2014

(87) PCT Pub. No.: WO2013/156314
PCT Pub. Date: Oct. 24, 2013

(65) Prior Publication Data
US 2015/0067773 A1    Mar. 5, 2015

(30) Foreign Application Priority Data

Apr. 18, 2012 (FR) ..................... 12 53552

(51) Int. Cl.
*G06F 21/71* (2013.01)
*G06F 12/14* (2006.01)
(Continued)

(52) U.S. Cl.
CPC ............... *G06F 21/71* (2013.01); *G06F 12/14* (2013.01); *G06F 21/556* (2013.01); *G06F 21/74* (2013.01); *G06F 21/85* (2013.01); *G06F 2221/2105* (2013.01)

(58) Field of Classification Search
CPC ....... G06F 21/556; G06F 21/85; G06F 12/14; G06F 2221/2105
See application file for complete search history.

(56) References Cited

U.S. PATENT DOCUMENTS 6,963,946 B1    11/2005  Dwork et al.
7,389,390 B2     6/2008  Giers
(Continued)

FOREIGN PATENT DOCUMENTS

WO    2004-099954    11/2004

OTHER PUBLICATIONS

International Search Report issued Jul. 9, 2013 in PCT/EP2013/057116 filed Apr. 4, 2013.

*Primary Examiner* — Robert Leung
(74) *Attorney, Agent, or Firm* — Oblon, McClelland, Maier & Neustadt, L.L.P.

(57) ABSTRACT

An electronic microcontroller system including: plural processors; at least one interface for exchange with at least one peripheral, the peripheral being user master of the electronic microcontroller system; a mechanism for access to a shared memory space; an interconnection matrix for interconnecting the exchange interface, the processors and the mechanism for access to a shared memory space; a mechanism managing applications involving a guaranteed level of security and integrity and of applications exhibiting a nonguaranteed level of security and integrity. The exchange interface cooperates with a secure isolation cell of the memory situated between the user master peripheral and the interconnection matrix.

7 Claims, 3 Drawing Sheets

(51) Int. Cl.
  *G06F 21/74* (2013.01)
  *G06F 21/55* (2013.01)
  *G06F 21/85* (2013.01)

(56) References Cited

U.S. PATENT DOCUMENTS

| | | | |
|---|---|---|---|
| 7,779,254 B1* | 8/2010 | Crosmer et al. | 713/166 |
| 2002/0194486 A1* | 12/2002 | Heinrich et al. | 713/200 |
| 2003/0200451 A1 | 10/2003 | Evans et al. | |
| 2004/0003262 A1 | 1/2004 | England et al. | |
| 2004/0250063 A1 | 12/2004 | Gulick et al. | |
| 2006/0090084 A1* | 4/2006 | Buer | 713/189 |
| 2007/0088857 A1 | 4/2007 | Schluessler et al. | |
| 2008/0005586 A1* | 1/2008 | Munguia | 713/189 |
| 2008/0114906 A1 | 5/2008 | Hummel et al. | |
| 2009/0287895 A1* | 11/2009 | Foley et al. | 711/163 |
| 2009/0313397 A1 | 12/2009 | England et al. | |
| 2011/0320652 A1* | 12/2011 | Craddock et al. | 710/64 |

* cited by examiner

SYSTEM FOR MANAGING SECURE AND NONSECURE APPLICATIONS ON ONE AND THE SAME MICROCONTROLLER

TECHNICAL FIELD OF THE INVENTION

The present invention pertains to a system for managing applications exhibiting a high level of security and integrity as well as applications not exhibiting any particular criticality, on one and the same microcontroller system.

Thus, the present invention relates to the management of systems that are critical from the point of view of the security and of the integrity, within the framework of the simultaneous operation, on one and the same controller, of critical applications, termed "safe", and therefore exhibiting a high and guaranteed level of integrity and security, and of non-critical applications, termed "no safe", and exhibiting a non-guaranteed level of integrity and security.

PRIOR ART

The systems concerned in the present invention are controllers exhibiting architectures with several processors or micro-processors and the system according to the invention addresses their use in an environment sensitive to problematic issues of security, associated with a general problematic issue of recognized certification of these systems, in order to guarantee security and integrity. The SIL (Safety Integrity Level) standard serves for example to assess the reliability of the security functions of programmable electrical and electronic systems and to give such certifications. Various SIL "integrated security levels" exist, ranging from 1 to 4, from the least secure to the most secure, in particular defined in the "European Functional Safety standards".

Currently, to take into account the problematic issue dealing with the coexistence of applications termed "safe" (that is to say involving a high and guaranteed level of integrity and security) and of "no safe" applications (that is to say not involving a high and guaranteed level of integrity and security), the known technologies relate essentially to the notions of virtualization and of hypervisors.

The person skilled in the art possesses in his general knowledge the main characteristics of these technologies. Briefly, it is recalled that virtualization technologies consist of a security software mechanism in which a management layer, occupied for example by a hypervisor, exhibiting a very high level of reliability, comprises means for separating independent software platforms running on one and the same processor. To do this, said hypervisor manages one or more memory management units, usually dubbed MMU, on the basis of one memory management unit per processor, making it possible to partition the use of shared resources, in particular of a memory space, between the various applications.

Such a hypervisor may exhibit the capacity to manage several processors independently; for example, said hypervisor may have the capacity to restart a processor associated with an operating system without restarting the other processors.

By way of illustration of a technology implementing the virtualization techniques mentioned hereinabove, it will be possible to refer to document EP1067461A1. Moreover, documents U.S. 2008114906A1 and U.S. Pat. No. 7,389,390 B2 describe systems with several processors furnished with at least one exchange interface for exchanges with at least one peripheral.

However, although it tackles the general problematic issue of managing the coexistence of "safe" and "no safe" applications on one and the same microcontroller system, the implementation of a hypervisor exhibits certain drawbacks. Firstly, the use of a hypervisor degrades the performance of a system since this tool consumes resources and gives rise to a slowdown of the system. This may also be detrimental to aspects of "real-time" constraints associated with certain applications, be they "safe" or "no safe". Moreover, the hypervisor must itself be certified, for example SIL, as must the operating system which executes the "safe" applications. The software which manages the master peripherals must, moreover, be partitioned to execute the critical part under the stewardship of the hypervisor, and the non-critical part in the operating system in a standard manner. Thus, parts of drivers must be integrated into the hypervisor and consequently, likewise, form the subject of a certification.

Moreover, today, this type of equipment, with or without certification, exhibits a very high acquisition cost.

Thus, the technical problem aimed at by the present invention can be considered to be the search for a system making it possible to manage the coexistence of "safe" and "no safe" applications on one and the same microcontroller system, at reduced costs, therefore by circumventing the known but expensive technologies involving virtualization and certified hypervisor. The invention makes it possible, in an induced manner, to limit the quantity and the complexity of the code requiring certification. In its principle, it targets particularly the management of master peripherals, through the insertion of cells, preferably certified, for secure isolation of the memory, making it possible to retain the software which manages these master peripherals in the part of the code that does not need to form the subject of a certification, and thus to use standard drivers.

DISCLOSURE OF THE INVENTION

For this purpose, the subject of the invention is an electronic microcontroller system comprising:
- at least two processors of which one processor, termed the secure processor, is dedicated to the applications involving a guaranteed level of security and integrity;
- at least one exchange interface for exchanges with at least one peripheral, said peripheral being user master of said electronic microcontroller system;
- means of access to a shared memory space;
- an interconnection matrix for interconnecting said exchange interface, said processors and said means of access to a shared memory space.

According to the invention, the electronic microcontroller system moreover comprises means for managing applications involving a guaranteed level of security and integrity and applications exhibiting a non-guaranteed level of security and integrity, and said exchange interface cooperates with a cell for secure isolation of the memory situated between said user master peripheral and the interconnection matrix. Moreover, the microcontroller system according to the invention comprises several user master peripherals each having a cell for secure isolation of the memory, each cell for secure isolation of the memory being managed by the secure processor.

Advantageously, each processor is furnished with a unit for managing the secure memory.

Advantageously, the secure processor is devoid of any operating system, the other processor or processors exhibiting a standard operating system.

Alternatively, the secure processor comprises a specific operating system, the other processor or processors exhibiting a standard operating system, said specific operating system being different from said standard operating system.

According to one embodiment, the microcontroller system comprises three processors configured in such a way that:
- a first processor is intended for the implementation of applications involving a non-guaranteed level of security and integrity and relies on a first standard operating system;
- a second processor is intended for the implementation of applications involving a non-guaranteed level of security and integrity corresponding to communication and exchange functions, and relies on a second standard operating system, that may be identical to the first standard operating system;
- a third processor is dedicated to the implementation of applications involving a guaranteed level of security and integrity and does not rely on any operating system, or relies on a third operating system distinct from the first and second standard operating systems.

Advantageously, in the case where the user master peripheral seeks to access an address of the shared memory space, said shared memory space exhibiting a range of protected addresses, said cell for secure isolation of the memory situated between said user master peripheral and the interconnection matrix comprises a filter applying to said address of the memory to which the user master peripheral seeks access in order to implement means of prohibiting writing by said user master peripheral at said address if said address belongs to the range of protected addresses of the shared memory, and two comparators for verifying said address respectively before and after filtering by said filter so as to detect a possible error that may have arisen relating to said address.

BRIEF DESCRIPTION OF THE FIGURES

Other characteristics and advantages will become apparent in the detailed description which follows offered with regard to the appended drawings which represent.

DETAILED DESCRIPTION OF AT LEAST ONE EMBODIMENT

Figure 1:
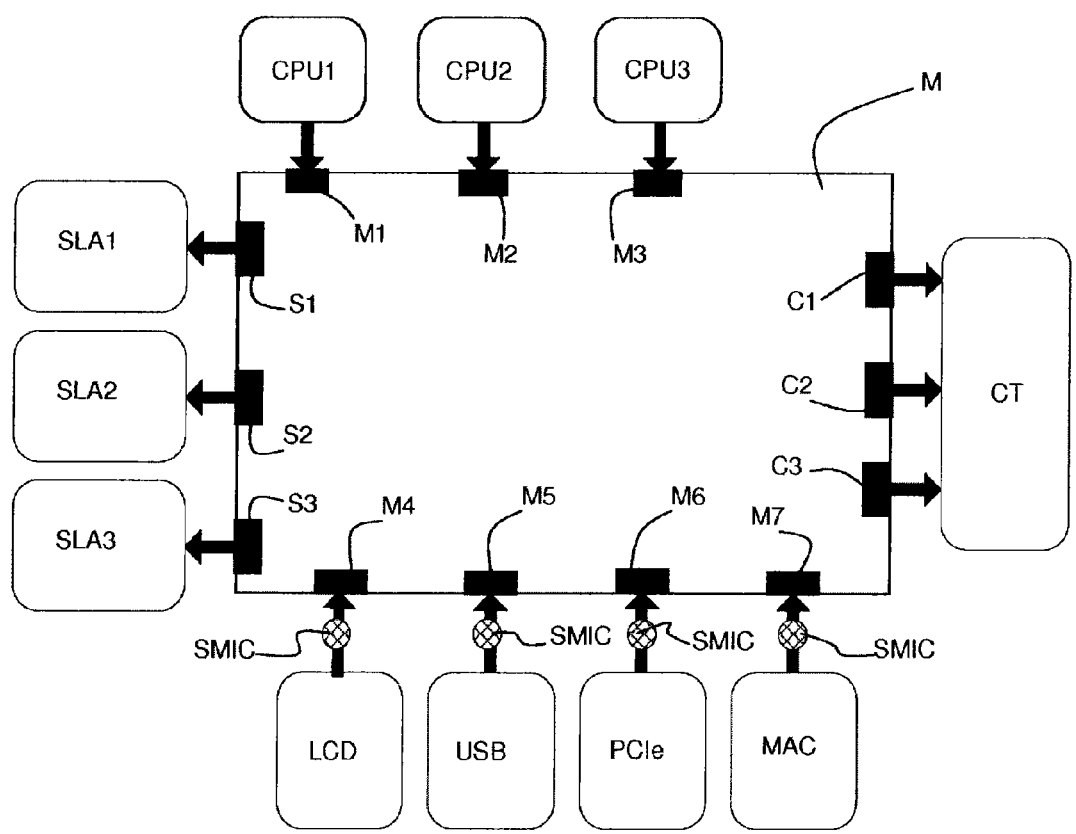
FIG. 1: a first functional diagram representing the implementation of the system according to the invention.

With reference to FIG. 1, the system according to the invention relates to the management of "safe" applications, that is to say exhibiting a level of safety, security and integrity which is at one and the same time guaranteed and high, and of "no safe" applications, that is to say exhibiting a non-guaranteed safety level.

FIG. 1 represents, schematically and partially, an exemplary electronic microcontroller system comprising three processors which access the set of resources of the microcontroller system by way of the master ports M1, M2, M3 provided for the processors. The example of FIG. 1 comprises three processors, but it is clear that the invention also applies to any electronic microcontroller system furnished with several processors, for example two processors or more than three processors. The various processors of the microcontroller system may be different from one another. On the other hand, the various processors may be integrated into one and the same electronic component, seeing as they are linked together by an interconnection matrix.

The microcontroller system interacts moreover with a shared memory space by way of a memory controller CT through the ports C1, C2, C3, and checks functions implemented by slave peripherals SLA1, SLA2, SLA3 not having the initiative of the use of the microcontroller, by way of slave ports S1, S2, S3. A serial link interface, an SDcard interface, a CompactFlash interface are examples of slave peripherals.

Finally, the microcontroller system is invoked by user master peripherals linked to it by way of dedicated interfaces and which access the resources of the microcontroller by way of the master ports M4, M5, M6, M7 provided for said master peripherals. These peripherals are dubbed "user masters" since they are master users of the microcontroller system, in the sense that they have the capacity to access the shared memory space themselves, in contradistinction to slave peripherals which cannot access same directly.

The user master peripherals are, in particular, peripherals corresponding to standards, for example LCD (Liquid Crystal Display) touchscreens, USB peripherals (Universal Serial Bus, from the name of the well known standard relating to a serial transmission computer bus), PCIe, or PCI Express expansion boards (Peripheral Component Interconnect Express, from the name of the known standard allowing the connection of expansion boards to a motherboard), or else MAC Ethernet boards for connection to a network.

The interconnection matrix M effects the interconnection between the processors CPU1, CPU2, CPU3, the shared memory space, via the memory controller CT, the user master peripherals, for example LCD, USB, PCIe, MAC, and their dedicated interfaces, and the slave peripherals SLA1, SLA2, SLA3.

According to the invention, the microcontroller system represented in FIG. 1 furthermore comprises cells for secure isolation of the memory SMIC, situated between said LCD, USB, PCIe, MAC user master peripherals and the interconnection matrix M. In practice, each user master peripheral is connected to the interconnection matrix M via a distinct cell for secure isolation of the memory SMIC.

These cells for secure isolation of the memory SMIC are advantageously able to filter the accesses to the shared memory space required by the LCD, USB, PCIe, MAC user master peripherals before their transmission, via the interconnection matrix M, to the memory controller CT of the shared memory space.

Figure 2:
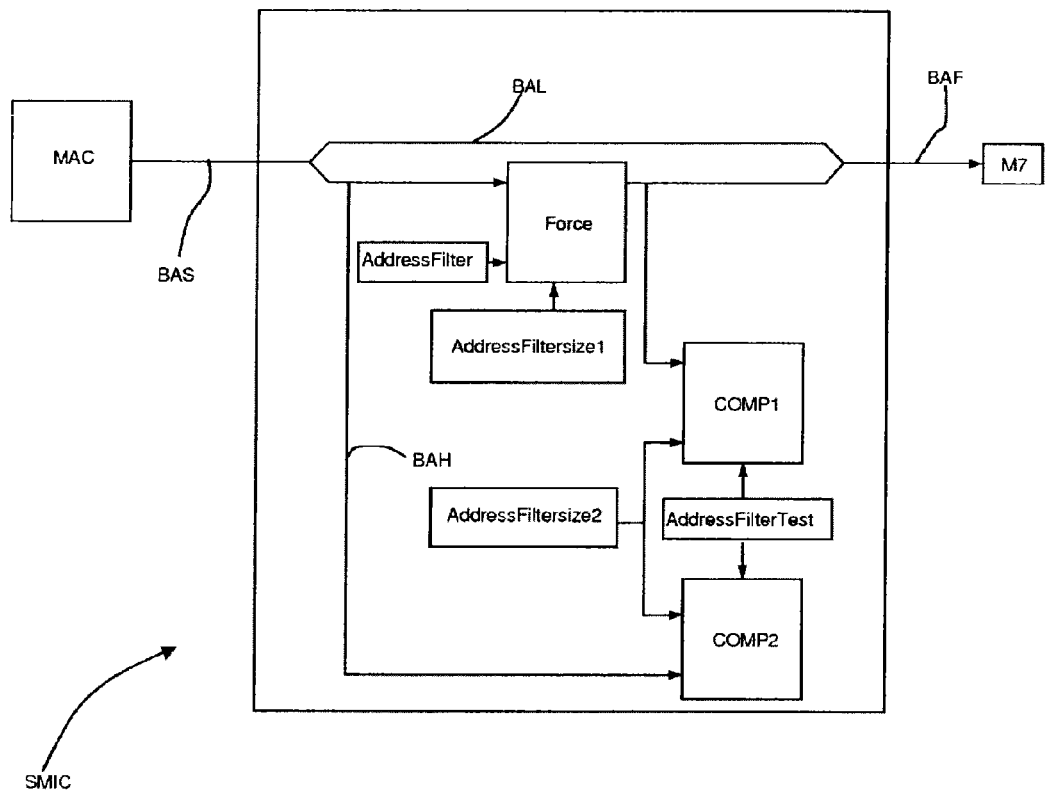
FIG. 2: an exemplary embodiment of a cell for secure isolation of the memory in the system according to the invention.

An exemplary embodiment of such a cell for secure isolation of the memory SMIC is presented in FIG. 2.

Thus, FIG. 2 represents an architecture of cell for secure isolation of the memory SMIC situated between a user master peripheral of the microcontroller, such as a MAC Ethernet board, and the interconnection matrix M.

In this example, a source address bus SAB of 32 bits originating from the master peripheral MAC is considered. The high-order bits, for example bits 20 to 31, are conveyed by a "high" address bus HAB of 12 bits to the forcing function Force while the low-order address bits, for example bits 0 to 19, are transmitted without filtering via the "low" address bus LAB of 20 bits. The set of 32 bits, comprising the 20 filtered bits and the 12 unfiltered bits, is thereafter directed to the master port M7 via the filtered address bus FAB. The forcing function Force is able to force the address which the master peripheral MAC is authorized to access, in particular in order to write a new value. A first register Addressfilter dictates the value of the forcing address to the forcing function Force.

Within the framework of the present invention, two comparators COMP1 and COMP2 test, respectively before and after forcing by the forcing function Force, the address which the master peripheral MAC attempts to access, in particular in order to write a new value, and the value of address presented on the interface M7. The two comparators COMP1 and COMP2 verify that the address to be tested does indeed correspond to an authorized address by comparing the value of the high-address bits, for example the high-order bits 20 to 31, with the value held in a second register AddressFilterTest, for example of a size of 12 bits. If the comparators COMP1 or COMP2 detect an inequality between the compared addresses, an addressing error is raised so as to allow the detection of said error.

Within the framework of the present invention, the size of the range of the address bits to be filtered, in this instance to be forced and compared, may be variable. The value held in a third register AddressFilterSize1 thus dictates the number of address bits to be forced while the value in a fourth register AddressFilterSize2 dictates the number of bits to be compared.

This cell for secure isolation of the memory SMIC presented in FIG. 2 is able to satisfy the certification criteria defined by the standards in relation to the safety of industrial equipment since the injection of a mistake into the forcing device is detected at any moment.

Continuously, during the execution of the application considered, the forcing function Force forestalls any risk of writing of the master peripheral MAC outside of the range of addresses which is ascribed to it. A defect of the master peripheral MAC does not interfere with the security of the microcontroller or of the item of equipment in which it is integrated, as it does not disturb any protected data; moreover, such a defect is necessarily detected. A defect in the forcing function Force, in the first register AddressFilter or the third register AddressFiltersize1 may interfere with the security of the microcontroller or of the item of equipment in which it is integrated, but this defect will be detected by the cell for secure isolation of the memory SMIC through the comparison errors. In this case, the microcontroller or the item of equipment in which it is integrated will be placed in a safety position.

The comparison devices, namely the comparators COMP1, COMP2, and the fourth register AddressFiltersize2, are by definition diagnostic tools; they cannot directly undermine the integrity of the data of the application during execution. During test phases, preferably including at least one test phase when starting the item of equipment in which the microcontroller is integrated, the application may be suspended and its data tested by injecting an error, for example injecting a different value into the first register AddressFilter from that expected at the level of the second register AddressFiltertest.

Thus, the cell for secure isolation of the memory SMIC presented in FIG. 2 makes it possible to implement the invention.

Figure 3:
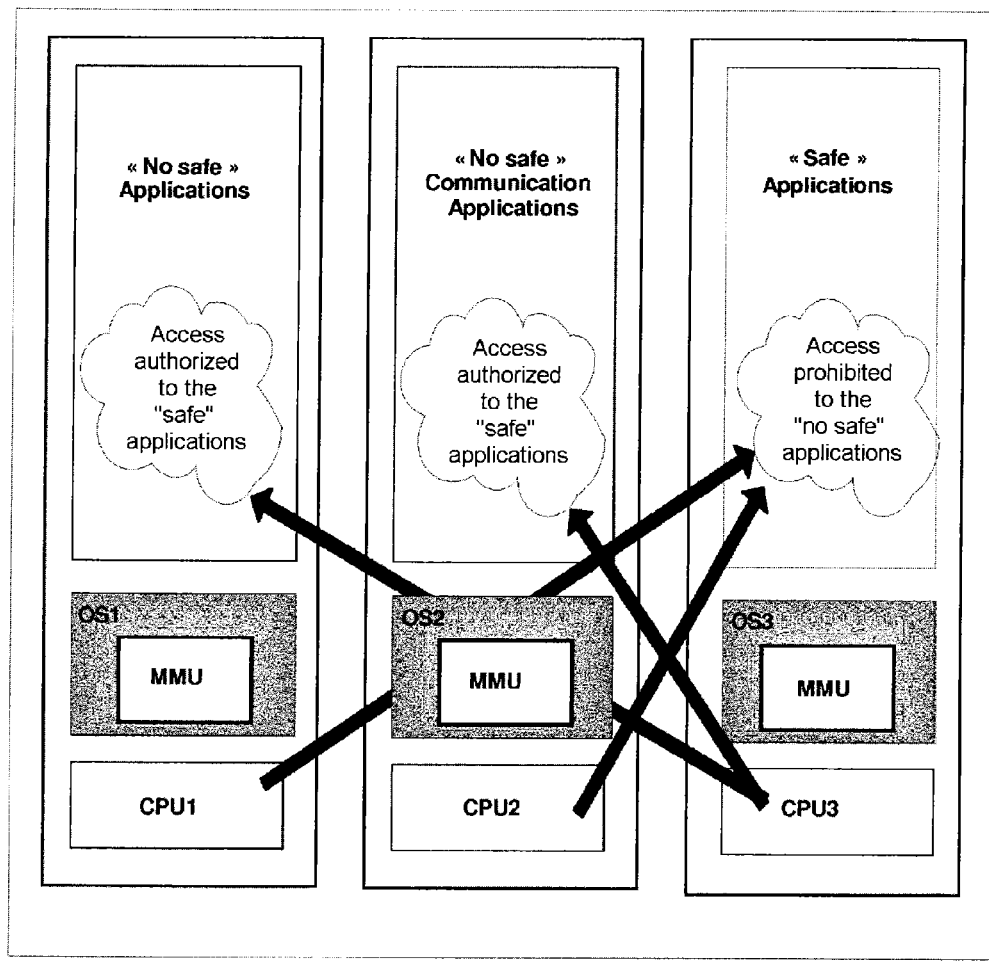
FIG. 3: a second functional diagram illustrating an exemplary system according to the invention.

FIG. 3 presents a preferred embodiment of the invention, in which the microcontroller system comprises three processors. According to the embodiment of FIG. 3, the microcontroller system according to the invention is then configured in such a way that:
   a first processor CPU1 is devoted to the implementation of "no safe" applications and relies on a first standard operating system OS1;
   a second processor CPU2 is devoted to the implementation of "no safe" applications corresponding to communication and exchange functions, in particular for example for exchanges with equipment connected to USB or Ethernet buses managed by the microcontroller system, and relies on a standard operating system OS2, that may be identical to the first standard operating system OS1;
   a third processor CPU3 (so-called secure processor) is devoted to the implementation of "safe" applications and does not rely on any operating system, or relies on a third operating system OS3 distinct from the first and second standard operating systems OS1, OS2.

In a preferred manner, it will be possible for the third processor to be different from the two previous ones. Indeed, the "safe" applications do not require for example the same calculation power as the "no safe" applications.

At the level of each of the operating systems OS1, OS2, OS3 is provided respectively a memory management unit MMU prohibiting access to the "safe" applications by the "no safe" applications.

In an advantageous manner, only these memory management units MMU need to be certified from the point of view of security in order to obtain a certification of the system as a whole.

Advantageously, with a view to obtaining a functional security certification for an industrial item of equipment based on such a microcontroller system, the certification of these memory management units may turn out to be a sufficient condition to be fulfilled for the criterion of memory isolation between applications.

Moreover, when the cell for secure isolation of the memory (SMIC) of each user master peripheral (LCD, USB, PCIe, MAC) is managed by the "Safe" application of the so-called secure processor (CPU3), this makes it possible advantageously to dispense with the certification of the software drivers of the user master peripherals. Indeed, even if the software drivers of the peripherals are not certified in themselves, the management of the cells for secure isolation of the memory by a "Safe" application makes it possible to avoid a possible poor untimely memory management stemming from these software drivers.

To summarize, the system according to the invention comprises the means for ensuring the secure management of "safe" and "no safe" applications on one and the same microcontroller, in particular by way of the implementation of a cell for secure isolation of the memory judiciously situated between the user master peripherals of said microcontroller and the interconnection matrix that it comprises.

The invention claimed is:
1. An electronic microcontroller system comprising:
   an electronic microcontroller including:
      at least two processors of which one processor, as a secure processor, is dedicated to applications involving a guaranteed level of security and integrity,
      at least one exchange interface for exchanges with at least one peripheral, the peripheral being user master of the electronic microcontroller system,
      means of access to a shared memory space, and
      an interconnection matrix for interconnecting the exchange interface, the
   processors, and the means of access to a shared memory space; and
   means for managing applications involving a guaranteed level of security and integrity and applications exhibiting a non-guaranteed level of security and integrity,
   the exchange interface cooperating with a cell for secure isolation of a memory situated between the user master peripheral and the interconnection matrix,
   the electronic microcontroller system further including plural user master peripherals each including a cell for secure isolation of the memory, each cell for secure isolation of the memory being managed by the secure processor, wherein the at least two processors include a first processor, a second processor, and the secure processor, the first processor being configured for implementation of applications involving a non-guaranteed level of security and integrity, the second processor being configured for implementation of applications involving a non-guaranteed level of security and integrity corresponding to communication and exchange functions, and the secure processor being dedicated to implementation of applications involving a guaranteed level of security and integrity and not relying on any operating system, or relying on an operating system distinct from operating systems of the first processor and the second processor.

2. The microcontroller system as claimed in claim 1, wherein each processor includes a unit for managing the memory.

3. The microcontroller system as claimed in claim 1, wherein the secure processor is devoid of any operating system, the first processor and the second processor exhibiting a standard operating system.

4. The microcontroller system as claimed in claim 1, wherein the secure processor comprises a specific operating system, the first processor and the second processor exhibiting a standard operating system.

5. The microcontroller system as claimed in claim 1, wherein
  the first processor relies on a first standard operating system,
  the second processor relies on a second standard operating system that is identical to the first standard operating system, and
  the secure processor relies on the operating system that is distinct from the first and second standard operating systems.

6. The microcontroller system as claimed in claim 1, wherein the user master peripheral seeks to access an address of the shared memory space, the shared memory space exhibiting a range of protected addresses, wherein the cell for secure isolation of the memory situated between the user master peripheral and the interconnection matrix comprises a filter applying to the address of the shared memory space to which the user master peripheral seeks access to implement means of prohibiting writing by the user master peripheral at the address if the address belongs to the range of protected addresses of the shared memory space, and two comparators for verifying the address respectively before and after filtering by the filter to detect a possible error that may have arisen relating to the address.

7. An electronic microcontroller system comprising:
  at least two processing circuits of which one processing circuit, as a secure processing circuit, is dedicated to applications involving a guaranteed level of security and integrity;
  at least one exchange interface for exchanges with at least one peripheral, the peripheral being user master of the electronic microcontroller system; and
  an interconnection matrix for interconnecting the exchange interface and the processing circuits, wherein
  the exchange interface cooperates with a cell for secure isolation of a memory situated between the user master peripheral and the interconnection matrix,
  the electronic microcontroller system includes plural user master peripherals each including a cell for secure isolation of the memory, each cell for secure isolation of the memory being managed by the secure processing circuit,
  the at least two processing circuits include a first processing circuit, a second processing circuit, and the secure processing circuit,
  the first processing circuit is configured to implement applications involving a non-guaranteed level of security and integrity,
  the second processing circuit is configured to implement applications involving a non-guaranteed level of security and integrity corresponding to communication and exchange functions, and
  the secure processing circuit is dedicated to implement applications involving a guaranteed level of security and integrity and does not rely on any operating system, or relies on an operating system distinct from operating systems of the first processing circuit and the second processing circuit.

* * * * *